(12) United States Patent
Nakano et al.

(10) Patent No.: US 9,057,352 B2
(45) Date of Patent: Jun. 16, 2015

(54) WAVE POWER GENERATION DEVICE AND METHOD OF CONTROLLING THE SAME

(71) Applicant: MITSUI ENGINEERING & SHIPBUILDING CO., LTD., Tokyo (JP)

(72) Inventors: Kunio Nakano, Tokyo (JP); Hiroyuki Nakagawa, Akishima (JP); Shogo Miyajima, Akishima (JP); Takashi Kawaguchi, Tokyo (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 0 days.

(21) Appl. No.: 14/157,038

(22) Filed: Jan. 16, 2014

(65) Prior Publication Data

US 2014/0197637 A1 Jul. 17, 2014

(30) Foreign Application Priority Data

Jan. 17, 2013 (JP) ................................. 2013-005953

(51) Int. Cl.
*F03B 13/10* (2006.01)
*F03B 13/12* (2006.01)
*H02P 9/04* (2006.01)
*F03B 15/00* (2006.01)
*F03B 13/18* (2006.01)

(52) U.S. Cl.
CPC .............. *F03B 15/00* (2013.01); *F03B 13/1845* (2013.01); *Y02E 10/38* (2013.01)

(58) Field of Classification Search
USPC .............................................. 290/42
See application file for complete search history.

(56) References Cited

U.S. PATENT DOCUMENTS

| | | | | |
|---|---|---|---|---|
| 4,599,858 A * | 7/1986 | La Stella et al. | ................. | 60/497 |
| 7,781,903 B2 * | 8/2010 | Buffard et al. | ................. | 290/42 |
| 8,084,877 B1 * | 12/2011 | Raisch | ............................ | 290/53 |
| 8,593,004 B2 * | 11/2013 | Piccinini | ......................... | 290/42 |
| 2011/0089689 A1 * | 4/2011 | Gregory | ........................ | 290/42 |
| 2013/0229011 A1 * | 9/2013 | Kawaguchi et al. | ........... | 290/42 |
| 2014/0084586 A1 * | 3/2014 | Henwood et al. | ............... | 290/42 |

FOREIGN PATENT DOCUMENTS

JP  2007-132336 A  5/2007

\* cited by examiner

*Primary Examiner* — Pedro J Cuevas
(74) *Attorney, Agent, or Firm* — Westerman, Hattori, Daniels & Adrian, LLP

(57) ABSTRACT

A wave power generation device for synchronizing a vertical movement of a float with all the wave periods, and a method of controlling the same. The device has a controller which controls a torque of a power generator, and the controller is configured to estimate a displacement and a speed of a float from data of a rotation number or a rotation speed of the power generator, to estimate a wave period from the displacement and the speed, and to determine a displacement coefficient corresponding to the wave period from a data table stored in advance, and to transmit a calculated product of the displacement coefficient and the displacement as a torque command to the power generator so as to control a torque of the power generator.

9 Claims, 3 Drawing Sheets

| PERIOD Ts(sec) | DISPLACEMENT COEFFICIENT $A_x$ | SPEED COEFFICIENT $B_x$ |
|---|---|---|
| 4 | $A_4$ | $B_4$ |
| 5 | $A_5$ | $B_5$ |
| 6 | $A_6$ | $B_6$ |
| 7 | $A_7$ | $B_7$ |
| 8 | $A_8$ | $B_8$ |
| 9 | $A_9$ | $B_9$ |
| 10 | $A_{10}$ | $B_{10}$ |
| 11 | $A_{11}$ | $B_{11}$ |

WAVE POWER GENERATION DEVICE AND METHOD OF CONTROLLING THE SAME

BACKGROUND OF THE INVENTION

1. Field of the Invention

The present invention relates to a wave power generation device, which generates power by extracting energy from waves through movement of a float floating on the sea and a method of controlling the same.

2. Description of the Related Art

Conventionally, there has been a wave bower generation device with a float floating on the sea or in the sea (see Patent Literature 1, for example). This wave power generation device has a power generator which generates power by converting an external force received by the float from waves to electricity. FIG. 4 illustrates an example of the wave power generation device. This power generating device 1X has a body 3, a float 4 which moves vertically along the body 3, a transmission mechanism 8 which converts the vertical movement of the float 4 into a rotary movement, and a power generator 5 connected to the transmission mechanism 8. This transmission mechanism 3 is constituted by a combination of a ball screw 6 and a ball nut 7, for example. The body 3 is installed as a floating type which is fixed to a sea floor by a mooring wire 11 or a bottom-mounted type which is installed upright from the sea floor.

Next, descriptions are given of an operation of the wave power generation device 1X. First, the float 4 of the wave power generation device 1X receives the external force from the waves and moves vertically. Along with the vertical movement of the float 4, the ball nut 7 fixed to the float 4 moves vertically. By means of this vertical movement of the ball nut 7, the ball screw 6 rotates and transmits the rotary movement to the connected power generator 5. Here, the left side of FIG. 4 illustrates a state in which the ball screw 6 rotates in an arrow direction by a rise of the ball nut 7, while the right side in FIG. 4 illustrates a state in which the ball screw 6 rotates in a direction opposite to the above by lowering of the ball nut 7.

With this constitution, the wave power generation device 1X can rotate the power generator 5 by a kinetic energy of the waves and generate power. Here, it is known that power generation efficiency can be improved by making the vertical movement of the float 4 resonate with a wave period (also called synchronization) and by giving an appropriate power generation load. Thus, regarding the float 4, its natural period is designed so that resonance (synchronization) occurs at a wave period of a sea area where the wave power generation device 1X is installed. Here, in order to make the vertical movement of the float 4 resonate (synchronize) at the wave period, it is required to make an inertia force and a restoring force of the float. 4 in the wave period equal to each other.

Descriptions are given below of a process in which a natural period T of the float 4 is determined. First, in general, a natural period To (sec) of a simple oscillating system having one end of a spring having a spring constant ko (N/m) fixed and the other end attached with a mass Mo (kg) can be expressed by the following formula:

$$T_0 = 2\pi \sqrt{\frac{M_0}{k_0}}$$ [Formula 1]

Subsequently, if the float 4 is floating on a water surface, a restoring force applied to the float (buoyancy less weight) works as a spring force. Assuming that the float 4 has a columnar shape, this spring constant k can be expressed by the following formula using a columnar sectional area S:

$$k = \rho g S$$ [Formula 2]

Here, reference character $\rho$ denotes a water density (1000 kg/m$^3$) and reference character g denotes gravitational acceleration (0.6 m/sec$^2$). Moreover, a mass M (kg) of the float 4 can be expressed by the following formula, assuming that a draft (submerged depth) is df (m):

$$M = \rho S d_f$$ [Formula 3]

As described above, the natural period T (sec) of the float 4 can be expressed by the following formula. Since the float 4 is on the water, an added mass with a mass ratio $\alpha$ is considered. This added mass refers to a mass apparently increased by movement of the peripheral water together with the vertical movement of the float 4:

$$T = 2\pi \sqrt{\frac{(1+\alpha)M}{k}}$$ [Formula 4]
$$= 2\pi \sqrt{\frac{(1+\alpha)\rho S d_f}{\rho g S}}$$
$$= 2\pi \sqrt{\frac{(1+\alpha) d_f}{g}}$$

From the aforementioned formulas, it is known that the natural period T of the float 4 having a constant sectional area like a column has nothing to do with a diameter of the float 4 but depends only on its draft df. That is, when the wave power generation device 1X is designed, the natural period T of the float 4 is fixed to a period of a power generation design wave (wave desired to have maximum power generation efficiency) of the sea area for installation. On the other hand, the wave period Ts changes all the time in 4 to 10 seconds, for example.

Subsequently, descriptions are given of a principle by which the wave power generation device 1X absorbs wave energy and generates power. First, the vertical movement of the float 4 of the wave power generation device 1X on which only the power generator 5 is loaded can be expressed by the following formula:

$$(M+m)z'' + (N+d)z' + Cz = F_z$$ [Formula 5]

Here, reference character M denotes a mass of the float, m denotes the added mass, N denotes wave attenuation of the float, d denotes a load attenuation of the power generator, C denotes a restoring force coefficient of the float, and Fz denotes a compulsion force by the waves. Reference characters z, z', and z'' denote vertical displacement, speed, and acceleration of the float, respectively. If the waves are regular waves, the aforementioned formula 5 can be expressed by the following formula:

$$(C - \omega^2(M+m))z + (N+d)z' = F_z$$ [Formula 6]

Here, reference character $\omega$ denotes a circular frequency of the regular waves. Moreover, the energy of the waves absorbed by the float is calculated on a time average, of (dz')×z'. Therefore, by making adjustment so that a value in the parenthesis of the left first term of the aforementioned formula 6 becomes zero, the vertical movement of the float can be made to resonate with the wave period, and by adjusting the load attenuation d of the power generator to an appropriate numerical value, power generation efficiency can be improved.

However, the aforementioned wave power generation device 1X has some problems. First, it has a problem that improvement of power generation efficiency of the wave power generation device 1X is difficult. This is because the wave period. Ts changes in accordance with a season or a time zone while the natural period T of the float 4 is determined at the time of design and manufacture.

To solve this problem, it is also conceivable to adjust the natural period T of the float 4 by an adjustment mechanism for adjusting a mass or a restoring force of the float 4. Specifically, such an adjustment mechanism can be considered that a mass is changed by putting ballast water into the float 4 or an added mass is changed by installing a thin plate or the like in a submerged portion of the float 4. Moreover, such an adjustment mechanism can be considered which changes a waterplane area of the float 4 or installs a spring or the like between the float 4 and the body 3.

However, if the aforementioned adjustment mechanism is employed, a second problem occurs that a manufacturing cost of the wave power generation device rises. This is because the cost increases by addition of the new adjustment mechanism. Moreover, along with installation of equipment constituting the adjustment mechanism and the like, a weight of the float increases, its strength calculation or the like becomes necessary, and its design becomes complicated.

Thirdly, employment of the adjustment mechanism also leads to a problem that a failure or a maintenance frequency increases. This is because a possibility that devices constituting the adjustment mechanism and the like causes a failure and the like rises. Particularly, if the wave per generation device 1X is installed in the ocean where an environment is severe, a maintenance frequency further increases.

CITATION LIST

Patent Literature

Patent Literature 1: Japanese Unexamined Patent Application Publication No. 7007-132336

SUMMARY OF THE INVENTION

The present invention was made in view of the aforementioned problems and has an object to provide a wave power generation device which eliminates addition of an adjustment mechanism relating to a change in a mass or a shape to the float and an external sensor such as a wave meter and can improve power generation efficiency by synchronizing a vertical movement of the float with all the wave periods while a manufacturing cost of the wave power generation device, is suppressed and a method of controlling the same.

Problems to be Solved by the Invention

The wave power generation device according to the present invention in order to achieve, the aforementioned object is a wave power generation device comprising: a body; a float configured to move vertically along the body; a transmission mechanism configured to convert the vertical movement of the float to a rotary movement; and a power generator connected to the transmission mechanism, wherein the wave power generation device has a controller configured to control a torque of the power generator; and the controller has: either one of a configuration in which a displacement z and a speed z' of the float are estimated from data of a rotation number or a rotation speed of the power generator, a wave period is estimated from the displacement z and the speed z', and a displacement coefficient A corresponding to the wave period is determined from a data table stored in advance or a configuration in which the displacement z and the speed z' of the float are obtained from an acceleration sensor installed in the float, the wave period is estimated from the displacement z and the speed z', and the displacement coefficient A corresponding to the wave period is determined from the data table; and a configuration in which a product calculated from the displacement coefficient A and the displacement z is transmitted as a torque command Tq1 to the power generator so as to control a torque of the power generator.

With this configuration, power generation efficiency of the wave power generation device can be improved. This is because a force corresponding to an added mass force can be applied to the float by the configuration for torque control of the power generator, and the vertical movement of the float can be made to synchronize with the waves. In addition, a manufacturing cost of the wave power generation device can be suppressed. This is because the vertical movement of the float can be made to synchronize with the waves without adding an adjustment mechanism or the like. Moreover, a failure occurring in the wave power generation device or the like can be suppressed. This is because there is no need to install an external sensor such as a wave meter or an adjustment mechanism or the like.

In addition, with the configuration in which the acceleration sensor is installed inside the float, the working effect similar to the above can be obtained also by obtaining the displacement z and the speed z' of the float. This is because the acceleration sensor is inexpensive and can be easily installed inside the float.

In the aforementioned wave power generation device, the controller has a configuration in which a speed coefficient B is determined in addition to the displacement coefficient A corresponding to the wave period from the data table and a configuration in which a sum obtained by adding a product of the speed coefficient B and the speed z' to a product of the displacement coefficient A and the displacement z is transmitted as a torque command Tq2 to the power generator so as to control the torque of the power generator.

With this configuration, power generation efficiency of the wave power generation device can be further improved. This is because the power generation efficiency can be improved by adjusting the load attenuation d in proportion to the speed z' of the float to an appropriate numerical value in a state in which the vertical movement of the float is made to synchronize with the wave period.

A method of controlling a wave, power generation device according to the present invention in order to achieve the aforementioned object is a method of controlling a wave power generation device having a body, a float configured to move vertically along the body, a transmission mechanism configured to convert the vertical movement of the float to a rotary movement, a power generator connected to the transmission mechanism, and a controller configured to control a torque of the power generator, the method comprising: a data obtaining step of causing the controller to obtain a rotation number or a rotation speed of the power generator: a float state estimating step of estimating a displacement z and a speed z' of the float from data obtained in the data obtaining step; a wave state estimating step of estimating a wave period from the displacement z and the speed z'; a coefficient determining step of determining a displacement coefficient A corresponding to the wave period from a data table stored in advance; and a torque control step of transmitting a product calculated from the displacement coefficient A and the displacement z as a torque command Tq1 to the power generator so as to control the torque of the power generator. With this configuration, the working effect similar to the above can be obtained.

A method of controlling a wave power generation device according to the present invention in order to achieve the aforementioned object is a method of controlling a wave power generation device having a body, a float configured to move vertically along the body, a transmission mechanism configured to convert the vertical movement of the float to a rotary movement, a power generator connected to the transmission mechanism, and a controller configured to control a torque of the power generator, the method comprising: a wave state estimating step of causing the controller to obtain a displacement z and a speed z' of the float from an acceleration sensor installed in the float so as to estimate a wave period from the displacement z and the speed z'; a coefficient determining step of determining a displacement coefficient A corresponding to the wave period from a data table stored in advance; and a torque control step of transmitting a product calculated from the displacement coefficient A and the displacement z as a torque command Tq1 to the power generator so as to control the torque of the power generator. With this configuration, the working effect similar to the above can be obtained.

In the aforementioned method of controlling the wave power generation device, the method further comprises: a coefficient determining step of causing the controller to determine a speed coefficient B in addition to the displacement coefficient A corresponding to the wave period from the data table stored in advance; and a torque control step of causing the controller to transmit a sum obtained by adding a product of the speed coefficient B and the speed z' to the product of the displacement coefficient A and the displacement z as a torque command Tq2 to the power generator so as to control the torque of the power generator. With this configuration, the working effect similar to the above can be obtained.

In the aforementioned method of controlling the wave power generation device, the method further comprises: the wave state estimating step of causing the controller to estimate a wave height in addition to the wave period: and the coefficient determining step of causing the controller to determine at least a displacement coefficient A corresponding to the wave period and the wave height from the data table stored in advance. With this configuration, power generation efficiency of the wave power generation device can be further improved. This is because the optimal displacement coefficient A and speed coefficient B can be determined for each of different wave heights in addition to the wave frequency.

Advantageous Effect of the Invention

According to the wave power generation device and the method of controlling the same according to the present invention, the wave power generation device and the method of controlling the same can be provided which eliminates addition of an adjustment mechanism relating to a change in a mass or a shape to a float or an external sensor such as a wave meter and can synchronize the vertical movement of the float with any wave period so as to improve power generation efficiency while a manufacturing cost of the wave power generation device is suppressed.

DESCRIPTION OF THE EMBODIMENTS

Figure 1:
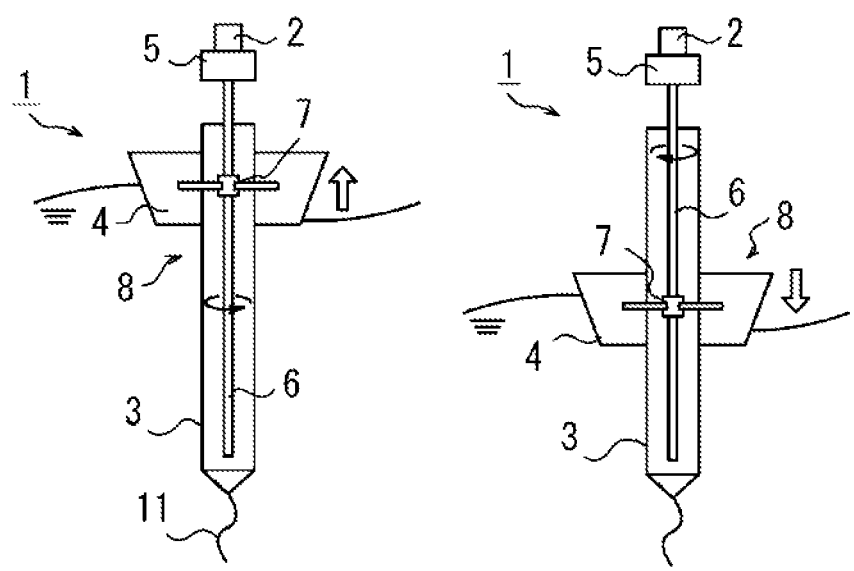
FIG. 1 is a schematic cross-sectional view of a wave power generation device of an embodiment according to the present invention.

Descriptions will be given below of a wave power generation device of an embodiment according to the present invention with reference to the attached drawings. FIG. 1 illustrates a schematic cross-sectional view of a wave power generation device 1 of the embodiment of the present invention. The wave power generation device 1 has a body 3, a float 4 configured to move vertically along the body 3, a transmission mechanism 8 configured to convert the vertical movement of the float 4 to a rotary movement, and a power generator (hereinafter referred to as a motor) 5 connected to the transmission mechanism 8. This transmission mechanism 8 is constituted by a combination of a ball screw 6 and a ball nut 7, for example. The body 3 is fixed to a sea floor by a mooring wire 11 (single rope tension mooring method) or fixed so as to stand upright from the sea floor (bottom-mounted type).

Moreover, the wave power generation device 1 has a controller 2 configured to control a torque of the motor 5. Furthermore, the wave power generation device 1 does not have an external sensor such as a wave meter.

Figure 2:
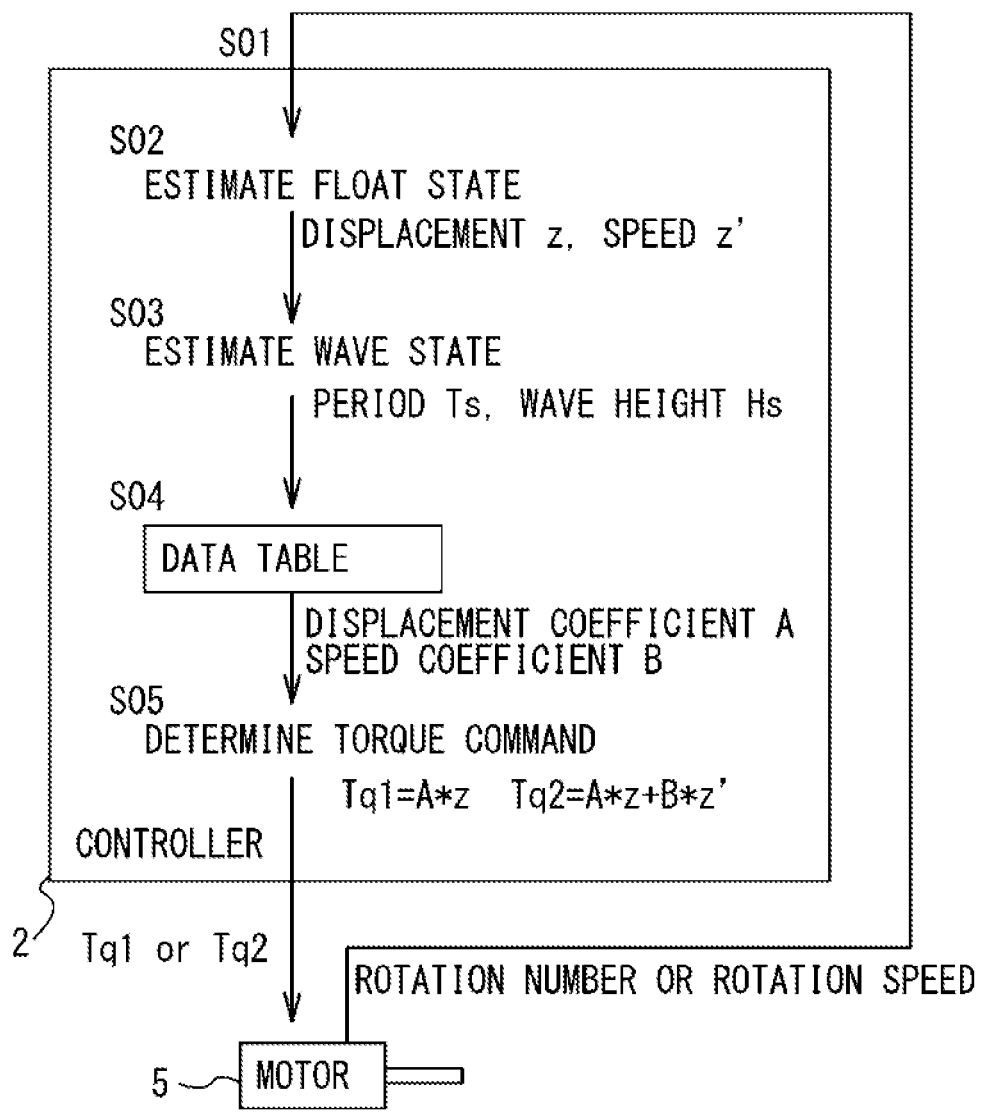
FIG. 2 is a schematic diagram of control of the wave power generation device of an embodiment according to the present invention.

Subsequently, descriptions are given of control of the wave power generation device 1. FIG. 2 illustrates a schematic diagram of the control of the wave power generation device 1. First, the controller 2 of the wave power generation device 1 obtains a rotation number or a rotation speed of the motor 5 from the motor 5 rotated by a vertical movement of the float 4 (data obtaining step S01). This data obtaining step preferably executed continuously and consecutively.

Subsequently, the controller 2 estimates a state of the vertical movement of the float (displacement z and speed z') from the obtained continuous data of the rotation number or the rotation speed of the motor 5 (float state estimating step S02). Moreover, the controller 2 estimates a wave state (period Ts) from the estimated displacement z and speed z' of the float (wave state estimating step S03). Subsequently, the controller 2 determines a displacement coefficient A corresponding to this wave period Ts from a data table stored in advance (coefficient determining step S04).

Subsequently, the controller 2 calculates a product of the displacement z and the displacement coefficient A of the float 4 as a torque Tq1 as indicated in the following formula, transmits this torque Tq1 as a torque command to the motor 5 and controls the torque of the motor 5 (torque control step S05).

$$Tq1 = A*z \qquad \text{[Formula 7]}$$

That is, the controller 2 has a configuration of controlling the motor 5 using the torque Tq1 in proportion to the displacement z of the float 4 as the torque command. By repeating the above, the wave power generation device 1 realizes synchronization of the vertical movement of the float 4 with the waves by torque control of the motor 5.

The displacement z and the speed z' of the float may be obtained by using an acceleration sensor or the like installed in the float. This acceleration sensor is inexpensive and does not increase a manufacturing cost of the wave power generation device. Moreover, since the acceleration sensor can be easily installed inside the float, it rarely causes a problem such as a failure.

Next, descriptions will be given of an embodiment in which the wave power generation device 1 is controlled differently with reference to FIG. 2. In this embodiment, first, at the coefficient determining step S04, the controller 2 determines a speed coefficient B in addition to the displacement coefficient A corresponding to this wave period Ts from the data table stored in advance.

Lastly, at the torque control step S05, the controller 2 calculates a sum obtained by adding the product of the speed z' and the speed coefficient B to the product of the displacement z and the displacement coefficient A of the float 4 as a torque Tq2 as indicated by the following formula, transmits this torque Tq2 as a torque command to the motor 5 and controls the torque of the motor 5.

$$Tq2 = A*z + B*z'$$ [Formula 8]

That is, the controller 2 has a configuration of controlling the motor 5 using the torque Tq2 obtained by adding the torque in proportion to the displacement z of the float 4 and the torque in proportion to the speed z' of the float 4 together as the torque command.

Figures 3, 4:
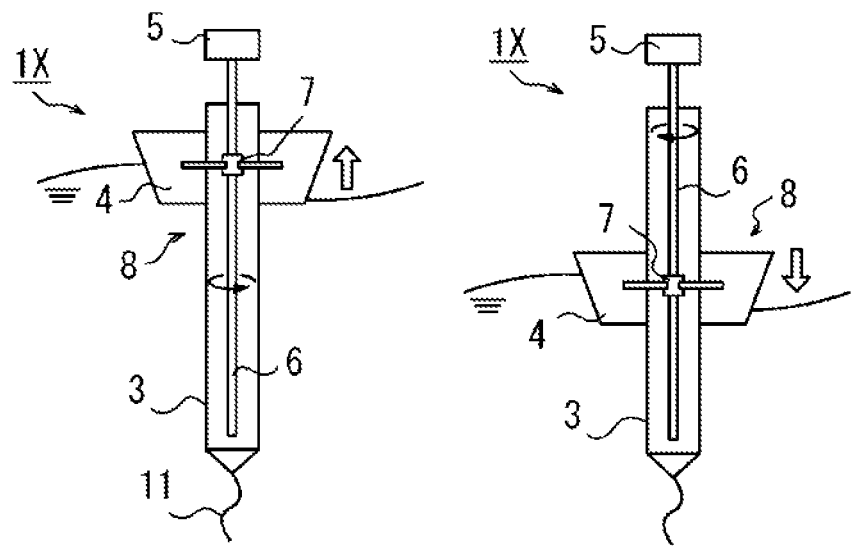
FIG. 3 illustrates one example of a data table used for control of the wave power generation device.
FIG. 4 is a schematic cross-sectional view of a conventional wave power generation device.

Subsequently, the data table stored in the controller 2 in advance will be described in detail. FIG. 3 illustrates an example of the data table. The data table stores the displacement coefficients A and the speed coefficients B corresponding to each of the wave periods Ts. That is, if the wave period Ts is 5 sec, for example, the optimal displacement coefficient is $A_5$, and the speed coefficient is $B_5$. These displacement coefficient A and speed coefficient B are values depending or a mass, buoyancy, a shape and the like of the float 4 and the wave, period Ts and can be determined by a plurality of methods described below.

A first method is a method of acquiring the displacement coefficient A and the speed coefficient B in advance by an experiment. Specifically, a wave power generation device manufactured in advance is arranged in an experimental water tank or the like, and waves having a certain period. Ts are generated. During this period, a power generation amount by the wave power generation device is obtained as data while the displacement coefficient A and the speed coefficient B are changed. The displacement coefficient A and the speed coefficient B when the power generation amount is the highest are stored as the optimal coefficients in the data table. The above procedure is repeated while the wave period Ts is changed, and the data table can be created. At this time, since it is not necessary to accurately grasp a mass, a restoring force and the like of the float, the optimal coefficients A and B can be easily determined. This method exerts an advantageous effect particularly if estimation of a mass, a friction force and the like of a mechanism in the power generating device moving vertically with the float is complicated.

A second method is a method of acquiring the displacement coefficient A and the speed coefficient B in advance, by simulation (calculation). Specifically, simulation having contents similar to the aforementioned experiment is performed on the basis of design data (a mass and a restoring force) of the float and the power generating device to be manufactured, and the displacement coefficient A and the speed coefficient B when the power generation amount is the highest are stored as the optimal coefficients in the data table. The above procedure is repeated while the wave period Ts is changed, and the data table can be created. At this time, since an experimental water tank or the like is not necessary, the optimal coefficients A and B can be determined while time and monetary costs are suppressed. This method exerts an advantageous effect particularly if estimation of a mass, a friction force and the like of a mechanism in the power generating device is easy.

A third method is a method of determining or adjusting the displacement coefficient A and the speed coefficient B by feedback when the wave power generation device 1 generates power. Specifically, in the wave power generation device 1 installed in the sea, a power generation amount is monitored, this power generation amount is fed back, and the displacement coefficient A and the speed coefficient B when the power generation amount is the highest are stored as the optimal coefficients in the data table. With this configuration, power generation efficiency of the wave power generation device 1 can be maintained for a long time. This is because, even if the natural period T of the float 4 changer due to aged deterioration, attached substances and the like, update control of the coefficients A and B can be started by a decrease in the power generation amount and the like so that the data table can be updated.

A combination of a plurality of the aforementioned methods may be employed. For example, it may be so configured that, at a stage of designing the float 4, the data table is created by the simulation according to the second method, and after the wave power generation device 1 is installed in the sea and power generation is started, the coefficients A and B are adjusted by the feedback according to the third method.

Here, if the wave power generation devices 1 are to be installed in plural, it may be so configured that the data table is created in one of the wave power generation devices 1, while the created data table is shared by the controllers of the other wave power generation devices. With this configuration, high power generation efficiency can be easily obtained in the plurality of the wave power generation devices.

With the aforementioned configuration, the wave power generation device 1 can obtain the following working effects. First, power generation efficiency of the wave power generation device 1 can be improved. This is because, with the configuration of executing the torque control of the motor 5 by the controller 2, the vertical movement of the float 4 can be made to synchronize (resonate) with the ever-changing wave period Ts.

Moreover, power generation efficiency of the wave power generation device can be further improved by the configuration of using the torque Tq2 as the torque command for the control. This is because the load attenuation d in proportion to the speed z' of the float can be adjusted to an appropriate numerical value in a state in which the vertical movement of the float is made to synchronize with the wave period so that power generation efficiency can be improved.

Secondly, a manufacturing cost of the wave power generation device 1 can be suppressed. This is because synchronization control of the float 4 can be realized without adding new equipment such as an adjustment mechanism of a mass or a shape of the float and the like to the wave power generation device 1. Moreover, this is because the vertical movement of the float 4 of the identical design can be synchronized with the wave period so that power generation efficiency can be improved in any sea area and in any season.

Thirdly, a failure or the like occurring in the wave power generation device 1 can be suppressed. This is because there is no need to install an external sensor or an adjustment mechanism of a mass or a shape of the float and the like.

The controller 2 may be configured so that a plurality of the data tables (hereinafter referred to as a data table group) created for each of the different wave heights Hs are stored. In this case, the controller 2 first estimates the wave height Hs in addition to the wave period Ts at the wave state estimating step. Subsequently, the controller 2 selects the data table corresponding to the wave height Hs estimated from the data table group and determines the displacement coefficient A corresponding to the period Ts or the displacement coefficient A and the speed coefficient B from this data table. Lastly, the controller 2 transmits the torque command Tq1 or Tq2 to the motor 5. Moreover, when the data table is to be created, any one of the aforementioned methods is executed while the wave height Hs is changed.

With this configuration, such a situation can be avoided that if the data table created when the wave height is small and wave energy is small (small wave height) is used when the wave, height is large and the wave, energy is large (large wave height) for float control, for example, the float is separated from the wave surface and power generation efficiency is rather lowered or a load is applied to the motor too much. That is, power generation efficiency of the wave power generation device can be further improved. This is because the optimal displacement coefficient A and speed coefficient B can be determined for each of the different wave heights Hs in addition to the wave period Ts.

Moreover, since the float can be controlled for the waves having any wave height from the small wave height to the large wave height, high power generation efficiency can be realized for any oceanographic condition in a sea area where the wave power generation device is installed.

Furthermore, the controller 2 and the control thereof in the present invention can be also employed for the other wave power generation devices. Specifically, the present invention can be also employed for a wave power generation device in which a transmission mechanism is constituted by a pinion gear installed in a power generator and a rack fixed to a float, a wave power generation device in which a power generator is constituted by a linear motor and a transmission mechanism is constituted by a rod for linearly moving a linear motor and the like.

DESCRIPTION OF THE NUMERALS

1 wave power generation device
2 controller
3 body
4 float
5 power generator (motor)
6 ball screw
7 ball nut
8 transmission mechanism
A displacement coefficient
B speed coefficient
z displacement (of float)
z' speed (of float)

What is claimed is:

1. A wave power generation device comprising:
   a body;
   a float configured to move vertically along the body;
   a transmission mechanism configured to convert the vertical movement of the float to a rotary movement; and
   a power generator connected to the transmission mechanism, wherein
   the wave power generation device has a controller configured to control a torque of the power generator; and
   the controller has:
      either one of a configuration in which a displacement z and a speed z' of the float are estimated from data of a rotation number or a rotation speed of the power generator, a wave period is estimated from the displacement z and the speed z', and a displacement coefficient A corresponding to the wave period is determined from a data table stored in advance or a configuration in which the displacement z and the speed z' of the float are obtained from an acceleration sensor installed in the float, the wave period is estimated from the displacement z and the speed z', and the displacement coefficient A corresponding to the wave period is determined from the data table; and
      a configuration in which a product calculated from the displacement coefficient A and the displacement z is transmitted as a torque command Tq1 to the power generator so as to control a torque of the power generator.

2. The wave power generation device according to claim 1, wherein
   the controller has:
   a configuration in which a speed coefficient B is determined in addition to the displacement coefficient A corresponding to the wave period from the data table; and
   a configuration in which a sum obtained by adding a product of the speed coefficient B and the speed z' to the product of the displacement coefficient A and the displacement z is transmitted as a torque command Tq2 to the power generator so as to control the torque of the power generator.

3. A method of controlling a wave power generation device having a body, a float configured to move vertically along the body, a transmission mechanism configured to convert the vertical movement of the float to a rotary movement, a power generator connected to the transmission mechanism, and a controller configured to control a torque of the power generator, the method comprising:
   a data obtaining step of causing the controller to obtain a rotation number or a rotation speed of the power generator:
   a float state estimating step of estimating a displacement z and a speed z' of the float from data obtained in the data obtaining step;
   a wave state estimating step of estimating a wave period from the displacement z and the speed z';
   a coefficient determining step of determining a displacement coefficient A corresponding to the wave period from a data table stored in advance; and
   a torque control step of transmitting a product calculated from the displacement coefficient A and the displacement z as a torque command Tq1 to the power generator so as to control the torque of the power generator.

4. A method of controlling a wave power generation device having a body, a float configured to move vertically along the body, a transmission mechanism configured to convert the vertical movement of the float to a rotary movement, a power generator connected to the transmission mechanism, and a controller configured to control a torque of the power generator, the method comprising:
   a wave state estimating step of causing the controller to obtain a displacement z and a speed z' of the float from an acceleration sensor installed in the float so as to estimate a wave period from the displacement z and the speed z';
   a coefficient determining step of determining a displacement coefficient A corresponding to the wave period from a data table stored in advance; and
   a torque control step of transmitting a product calculated from the displacement coefficient A and the displacement z as a torque command Tq1 to the power generator so as to control the torque of the power generator.

5. The method of controlling a wave power generation device according to claim 3, the method further comprising:

a coefficient determining step of causing the controller to determine a speed coefficient B in addition to the displacement coefficient A corresponding to the wave period from the data table stored in advance; and a torque control step of causing the controller to transmit a sum obtained by adding a product of the speed coefficient B and the speed z' to the product of the displacement coefficient A and the displacement z as a torque command Tq2 to the power generator so as to control the torque of the power generator.

6. The method of controlling a wave power generation device according to claim 3, the method further comprising:

the wave state estimating step of causing the controller to estimate a wave height in addition to the wave period: and the coefficient determining step of causing the controller to determine at least a displacement coefficient A corresponding to the wave period and the wave height from the data table stored in advance.

7. The method of controlling a wave power generation device according to claim 4, the method further comprising:

a coefficient determining step of causing the controller to determine a speed coefficient B in addition to the displacement coefficient A corresponding to the wave period from the data table stored in advance; and a torque control step of causing the controller to transmit a sum obtained by adding a product of the speed coefficient B and the speed z' to the product of the displacement coefficient A and the displacement z as a torque command Tq2 to the power generator so as to control the torque of the power generator.

8. The method of controlling a wave power generation device according to claim 4, the method further comprising:

the wave state estimating step of causing the controller to estimate a wave height in addition to the wave period: and the coefficient determining step of causing the controller to determine at least a displacement coefficient A corresponding to the wave period and the wave height from the data table stored in advance.

9. The method of controlling a wave power generation device according to claim 5, the method further comprising:

the wave state estimating step of causing the controller to estimate a wave height in addition to the wave period: and the coefficient determining step of causing the controller to determine at least a displacement coefficient A corresponding to the wave period and the wave height from the data table stored in advance.

* * * * *